US012584355B2

(12) United States Patent　　　(10) Patent No.:　US 12,584,355 B2

MacKarvich　　　(45) Date of Patent:　Mar. 24, 2026

(54) TRACK ASSEMBLY SYSTEM

(71) Applicant: Charles J. MacKarvich, Atlanta, GA (US)

(72) Inventor: Charles J. MacKarvich, Atlanta, GA (US)

( * ) Notice: Subject to any disclaimer, the term of this patent is extended or adjusted under 35 U.S.C. 154(b) by 0 days.

(21) Appl. No.: 18/825,324

(22) Filed: Sep. 5, 2024

(65) Prior Publication Data

US 2026/0062998 A1　　Mar. 5, 2026

(51) Int. Cl.
E06C 7/50　　　(2006.01)
H02G 3/06　　　(2006.01)

(52) U.S. Cl.
CPC ............. E06C 7/50 (2013.01); H02G 3/0608 (2013.01)

(58) Field of Classification Search
CPC ..... E06C 7/50; E06C 7/08; E06C 1/10; E04G 7/20; E04G 7/301; B63B 35/38; F16B 21/06; F16B 12/24; E04B 2001/2415; E04B 2001/2448; E04B 2001/2457; H02G 3/0608; H02G 3/0456; E04F 2201/00; Y10T 403/551
See application file for complete search history.

(56) References Cited

U.S. PATENT DOCUMENTS

| 660,308 | A | * | 10/1900 | Pixley | ................... F16B 7/0413 |
| | | | | | 411/460 |
| D42,411 | S | | 4/1912 | Herbert | |

| 1,094,109 | A | | 4/1914 | Alpaugh | |
| 2,905,416 | A | * | 9/1959 | Wiegand | .............. H02G 3/0456 |
| | | | | | 248/58 |
| 3,448,955 | A | * | 6/1969 | Fussell | ................. H02G 3/0608 |
| | | | | | 403/388 |
| 3,477,187 | A | | 11/1969 | Fruman et al. | |
| 3,826,206 | A | * | 7/1974 | Ruggles | ................... A47C 4/02 |
| | | | | | 411/517 |
| 4,158,335 | A | * | 6/1979 | Belcastro | ............. A47B 87/002 |
| | | | | | 403/292 |
| D288,802 | S | | 3/1987 | Bramwell | |
| D291,006 | S | | 7/1987 | Minichillo et al. | |
| 4,733,986 | A | | 3/1988 | Kenning et al. | |
| 4,917,216 | A | * | 4/1990 | Kimber | ..................... E06C 1/10 |
| | | | | | 182/151 |

(Continued)

FOREIGN PATENT DOCUMENTS

| DE | 4423430 A1 | * | 1/1996 | ............... E06C 1/10 |
| EP | 2518845 B1 | | 11/2013 | |

(Continued)

OTHER PUBLICATIONS

Non-Final Office Action for U.S. Appl. No. 29/976,881, dated Apr. 9, 2025, 7 Pages.

(Continued)

*Primary Examiner* — Colleen M Chavchavadze
(74) *Attorney, Agent, or Firm* — Buchalter LLP

(57)　　　　ABSTRACT

A splice plate assembly for a track assembly system can include a female housing component, the female housing component configured to be coupled to a first track of the system; and a male extrusion unit, the male extrusion unit configured to be coupled to a second track of the system and configured to be slideably coupled to the female housing component.

18 Claims, 15 Drawing Sheets

(56) References Cited

U.S. PATENT DOCUMENTS

| | | | | |
|---|---|---|---|---|
| 5,037,234 | A * | 8/1991 | De Jong | E06B 3/9616 |
| | | | | 403/268 |
| 5,203,135 | A * | 4/1993 | Bastian | F16B 7/0413 |
| | | | | 403/292 |
| 5,209,599 | A * | 5/1993 | Kronenberg | E06B 3/667 |
| | | | | 403/280 |
| 5,333,557 | A * | 8/1994 | Eickhoff | E02B 3/068 |
| | | | | 405/218 |
| D402,263 | S | 12/1998 | Scherer et al. | |
| D408,489 | S | 4/1999 | Recknagel | |
| D421,688 | S | 3/2000 | Doud et al. | |
| D430,543 | S | 9/2000 | Rohder | |
| 6,729,091 | B1 * | 5/2004 | Martensson | E04F 15/04 |
| | | | | 52/391 |
| 6,962,376 | B2 * | 11/2005 | Palzkill | G09F 3/0364 |
| | | | | 292/307 A |
| 7,607,273 | B2 * | 10/2009 | Henderson | E04B 1/2403 |
| | | | | 403/313 |
| 7,832,180 | B2 * | 11/2010 | Dolby | E04B 2/96 |
| | | | | 52/235 |
| 8,448,748 | B2 * | 5/2013 | Allred, III | E06C 7/087 |
| | | | | 182/115 |
| 8,602,164 | B2 * | 12/2013 | Allred, III | E06C 7/50 |
| | | | | 182/115 |
| 8,733,723 | B2 * | 5/2014 | Smith | F16L 3/00 |
| | | | | 248/57 |
| 8,800,718 | B2 * | 8/2014 | Allred, III | E06C 1/39 |
| | | | | 182/178.3 |
| 9,359,817 | B2 * | 6/2016 | Allred, III | E04C 3/40 |
| 9,988,842 | B2 | 6/2018 | Moss et al. | |
| 10,367,340 | B2 * | 7/2019 | Bae | H02G 3/0412 |
| 10,550,639 | B2 | 2/2020 | Tamez Reyes | |
| 11,199,049 | B2 | 12/2021 | Horst et al. | |
| 11,437,793 | B2 * | 9/2022 | Johnson | H02G 3/0608 |
| 11,923,668 | B2 | 3/2024 | Desai et al. | |
| 12,283,802 | B2 * | 4/2025 | Johnson | H02G 3/06 |
| D1,108,661 | S | 1/2026 | Mackarvich | |

| | | | | |
|---|---|---|---|---|
| 2006/0032175 | A1 * | 2/2006 | Chen | B32B 21/08 |
| | | | | 52/578 |
| 2010/0086348 | A1 | 4/2010 | Funahashi et al. | |
| 2011/0013978 | A1 | 1/2011 | Smith et al. | |
| 2013/0161127 | A1 * | 6/2013 | Allred, III | E06C 1/02 |
| | | | | 182/115 |
| 2014/0083042 | A1 * | 3/2014 | Hiragaki | F16B 7/182 |
| | | | | 52/655.1 |
| 2014/0311830 | A1 * | 10/2014 | Allred, III | E04C 3/40 |
| | | | | 156/60 |
| 2015/0001352 | A1 | 1/2015 | Kellerman et al. | |
| 2015/0008295 | A1 | 1/2015 | Bae et al. | |
| 2015/0322987 | A1 | 11/2015 | Romano | |
| 2018/0231038 | A1 | 8/2018 | Shelton | |
| 2019/0089141 | A1 | 3/2019 | Combes et al. | |
| 2020/0347594 | A1 | 11/2020 | Markley et al. | |
| 2024/0240522 | A1 | 7/2024 | Aamir et al. | |
| 2024/0240523 | A1 | 7/2024 | Aamir et al. | |

FOREIGN PATENT DOCUMENTS

| | | | | |
|---|---|---|---|---|
| GB | 810055 A | * | 3/1959 | E06C 1/10 |
| NZ | 4238780001 | | 2/2018 | |

OTHER PUBLICATIONS

Tie Down: "How to Install the Quick Pin Splice Plate Kit: Step-by-Step Tutorial", Installation, Dec. 13, 2024, 2 Pages, Retrieved from Internet, https://youtu.be/VVhexkEfUZ8?si=2nYc6_kWdV6Bswwn [retrieved Feb. 18, 2025].

Tie Down: "Telescoping Track Section Splice Plates Installation", published Feb. 27, 2024, 2 Pages, Retrieved from the internet, https://files.plytix.com/api/v1.1/file/public_files/pim/assets/41/96/eb/63/63eb96412c0736000157d6bd/texts/be/56/58/67/675856be7cb17e4d75d6932e/40740_Instructions.pdf, [retrieved Feb. 18, 2025].

Notice of Allowance for U.S. Appl. No. 29/976,881, dated Aug. 26, 2025, 18 pages.

* cited by examiner

TRACK ASSEMBLY SYSTEM

TECHNICAL FIELD

Field of Use

This disclosure relates to joining ladder tracks for use in material hoist systems. More specifically, this disclosure relates to splice plate assemblies configured to connect tracks.

Related Art

Ladders are frequently used to provide users access to elevated locations that would be inaccessible regularly. Ladders come in many shapes and sizes, and examples include straight ladders, extension ladders, stepladders, combination ladders, and extension ladders. While the shape and configuration of ladders may vary considerably, most ladders incorporate a basic track system. Ladder tracks typically comprise two primary rails extending in parallel relation to one another and are connected to each other by a plurality of rungs which are spaced in intervals. Commercially available ladder tracks are typically limited to certain specified lengths. Thus, when it is necessary to achieve a height which exceeds the basic length of a ladder track, a plurality of ladder tracks can be used by joining them together.

SUMMARY

It is to be understood that this summary is not an extensive overview of the disclosure. This summary is exemplary and not restrictive and is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is splice plate assembly for a track assembly system, the splice plate assembly comprising a female housing component, the female housing component configured to be coupled to a first track of the system; and a male extrusion unit, the male extrusion unit configured to be coupled to a second track of the system and configured to be slideably coupled to the female housing component.

In a further aspect, disclosed is a track assembly system, the track assembly comprising a first track; a second track; and a splice plate assembly, the splice plate assembly comprising a female housing component, the female housing component coupled to the first track; and a male extrusion unit coupled to the second track and configured to slideably engage the female housing component.

In yet another aspect, disclosed is a method of using a track assembly system, the method comprising coupling a female housing component to an end of a first track; coupling a first end portion of a male extrusion unit to an end of a second track; and inserting an opposite second end portion of the male extrusion unit into the female housing component.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and, together with the description, explain various principles of the disclosure. The drawings are not necessarily drawn to scale. Corresponding features and components throughout the figures may be designated by matching reference characters for the sake of consistency and clarity.

DETAILED DESCRIPTION

Figure 1:
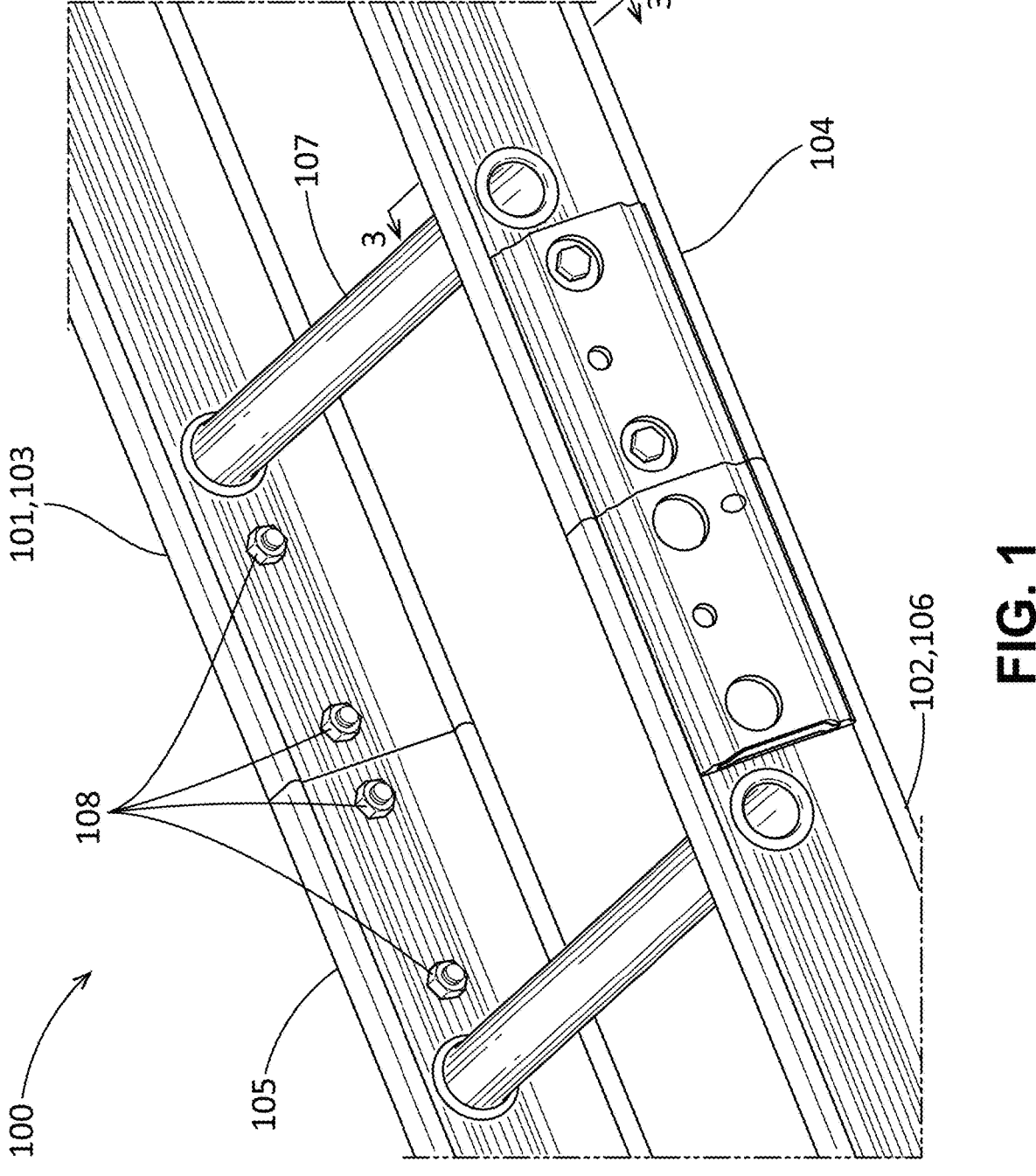
FIG. 1 is a front perspective view of a ladder track assembly comprising two splice plate assemblies.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an," and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes, and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. The phrase "at least one of A and B" as used herein means "only A, only B, or both A and B"; while the phrase "one of A and B" means "A or B."

As used herein, unless the context clearly dictates otherwise, the term "monolithic" in the description of a component means that the component is formed as a singular component that constitutes a single material without joints or seams. Unless otherwise specified herein, any structure disclosed in the drawings or in the written description can be monolithic whether or not such an explicit description of the structure is included herein. In one aspect, a splice plate assembly and associated methods, systems, devices, and various apparatuses are disclosed herein. In one aspect, the splice plate assembly can comprise a female housing component and a male extrusion unit configured to be slideably coupled to the female housing component. One aspect of a ladder track assembly 100 is disclosed and described in FIG. 1. The ladder track assembly 100 can join together two separate adjacent ladder tracks 101,102. Each ladder track 101,102 can comprise of two primary rails 103,104 and 105,106 extending in parallel relation to one another and connected together by a plurality of rungs 107 extending between the two rails 103, 105 and 104, 106 which can be placed therebetween at consistent intervals. Proximate to ends of each rail 103, 105, 104, 106 can be defined a fastener hole set 108. Fastener hole set 108 can comprise other configurations and may be arranged in other ways without departing from the scope of the current disclosure. In some aspects, as shown, each rail 103, 105, 104, 106 can be identical.

In some aspects, the ladder tracks 101,102 can be part of a standard ladder assembly, such as for a person ascending to an elevated surface such as a roof of a residential building. In other aspects, the ladder tracks 101,102 can be part of a transport system to move materials along the tracks 101, 102 to an elevated surface such as a roof of a residential or commercial building, such as with a movable cart. In some aspects, the ladder tracks 101, 102 can be used with a movable cart such as a winch utility system as shown in U.S. Pat. No. 11,199,049, issued on Dec. 14, 2021 or a material hoist system such as shown in U.S. Patent Application Publication No. 2024/0240523, published on Jul. 18, 2024, or U.S. Patent Application Publication No. 2024/0240522, published on Jul. 18, 2024, each of which is incorporated by reference herein in their entireties.

Figure 2:
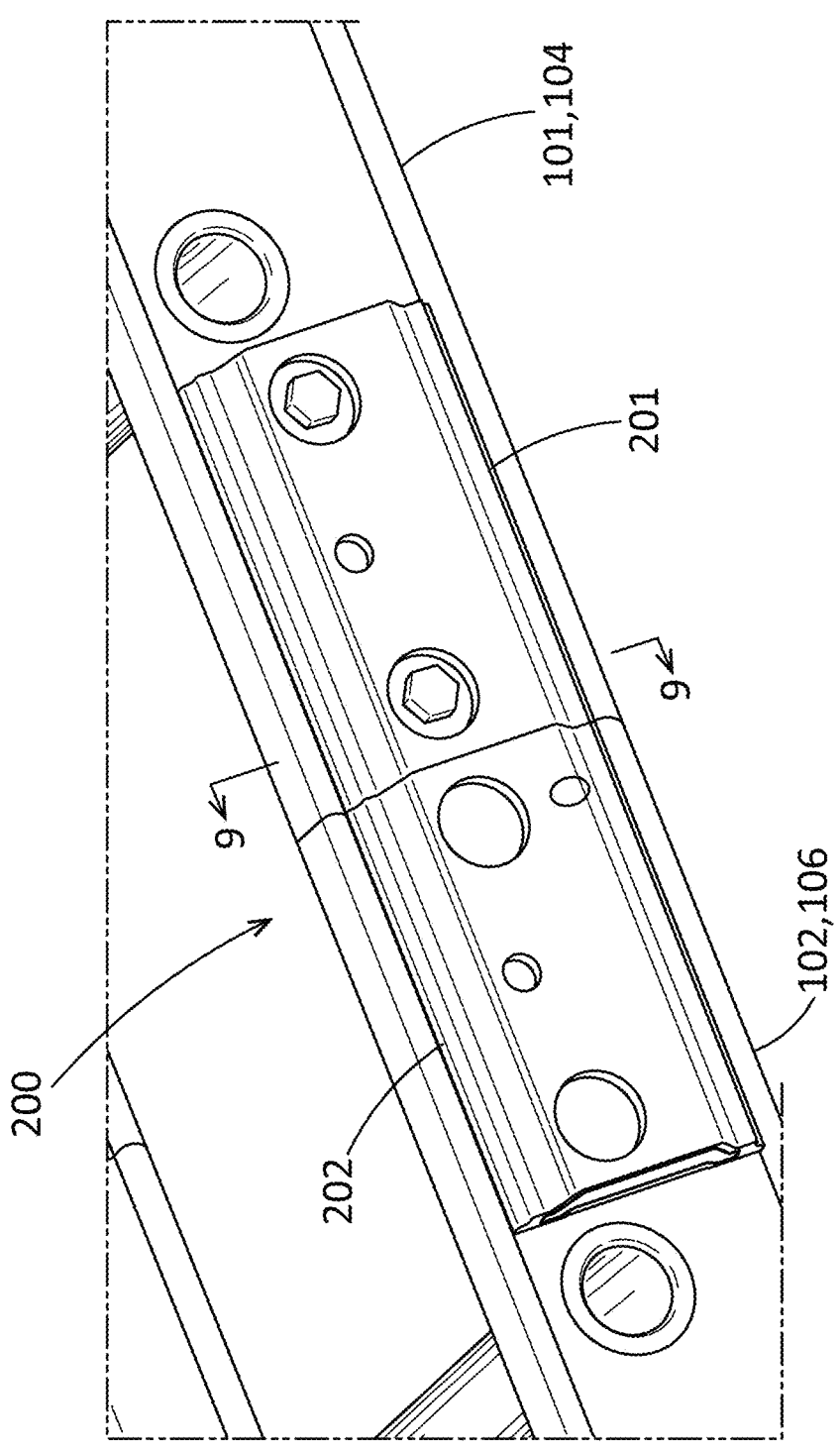
FIG. 2 is a front perspective view of a splice plate assembly comprising two track rails, two female housing components, and a male extrusion unit.

FIG. 2 is a front perspective view of a splice plate assembly 200 mounted on rails 104 and 106 of two ladder tracks 101, 102. Each splice plate assembly 200 can comprise a first female housing component 201 and a second female housing component 202. The first and second female housing components 201,202 are dimensioned and produced to have a relatively secure abutting fit with the rails 104 and 106 to attach the splice plate assembly 200 with the ladder tracks 101, 102.

Figure 3:
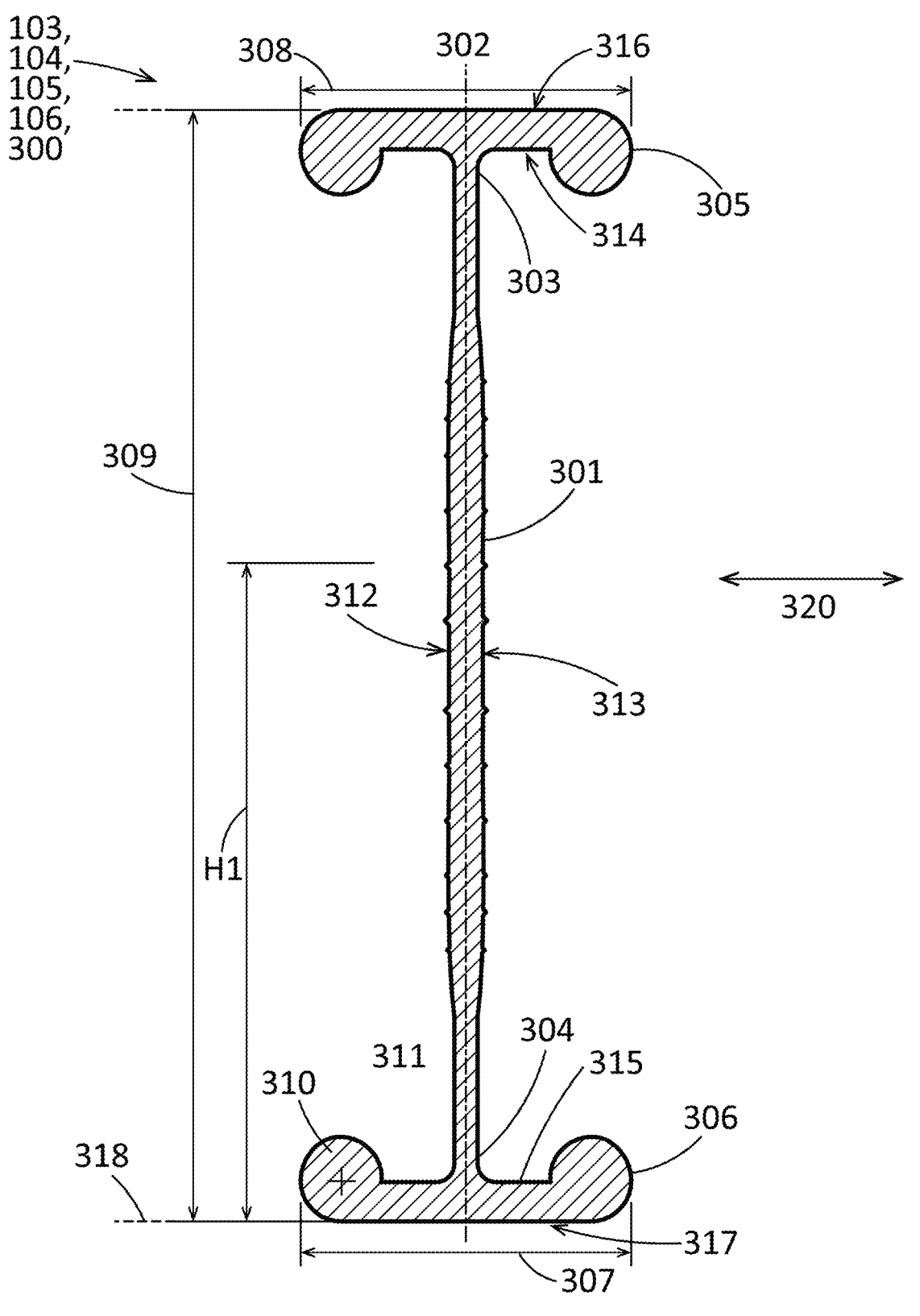
FIG. 3 is a sectional view of a track of the rail of FIG. 1 taken from line 3-3 of FIG. 1.

FIG. 3 is a sectional view of a rail 104 of the track 101 of FIG. 1 taken along line 3-3 of FIG. 1. Each of or either of the rails 103, 104, 105, 106 can comprise a rail body 300. In some aspects, the rail body 300 can define an I-shaped beam. The rail body 300 can comprise a main member or web 301, which can define a vertical centerline 302 and can define a first edge 303 and a second edge 304 distal from the first edge 303. The rail body 300 can comprise a first flange 305, which can intersect or extend from the first edge 303 of the web 301. The rail body 300 can comprise a second flange 306, which can intersect or extend from the second edge 304 of the web 301. Each of or either of the flanges 305,306 can extend beyond the web 301 in the lateral direction 320 and can define flange widths 307,308. The rail body 300 can define an overall height 309. Each of or either of the flanges 305,306 can define bulbous portions or enlarged portions 310, each of which can define a radius 311. The web 301 can define an inboard surface 312 and an outboard surface 313. Either or each of the flanges 305,306 can define an inner surface 314,315 and an outer surface 316,317. The rail body 300 can define a track front surface datum 318, which can represent a datum plane in which the outer surface 317 lies. The center of fastener hole set 109 is a height H1 from the inner surface 315.

Figure 4:
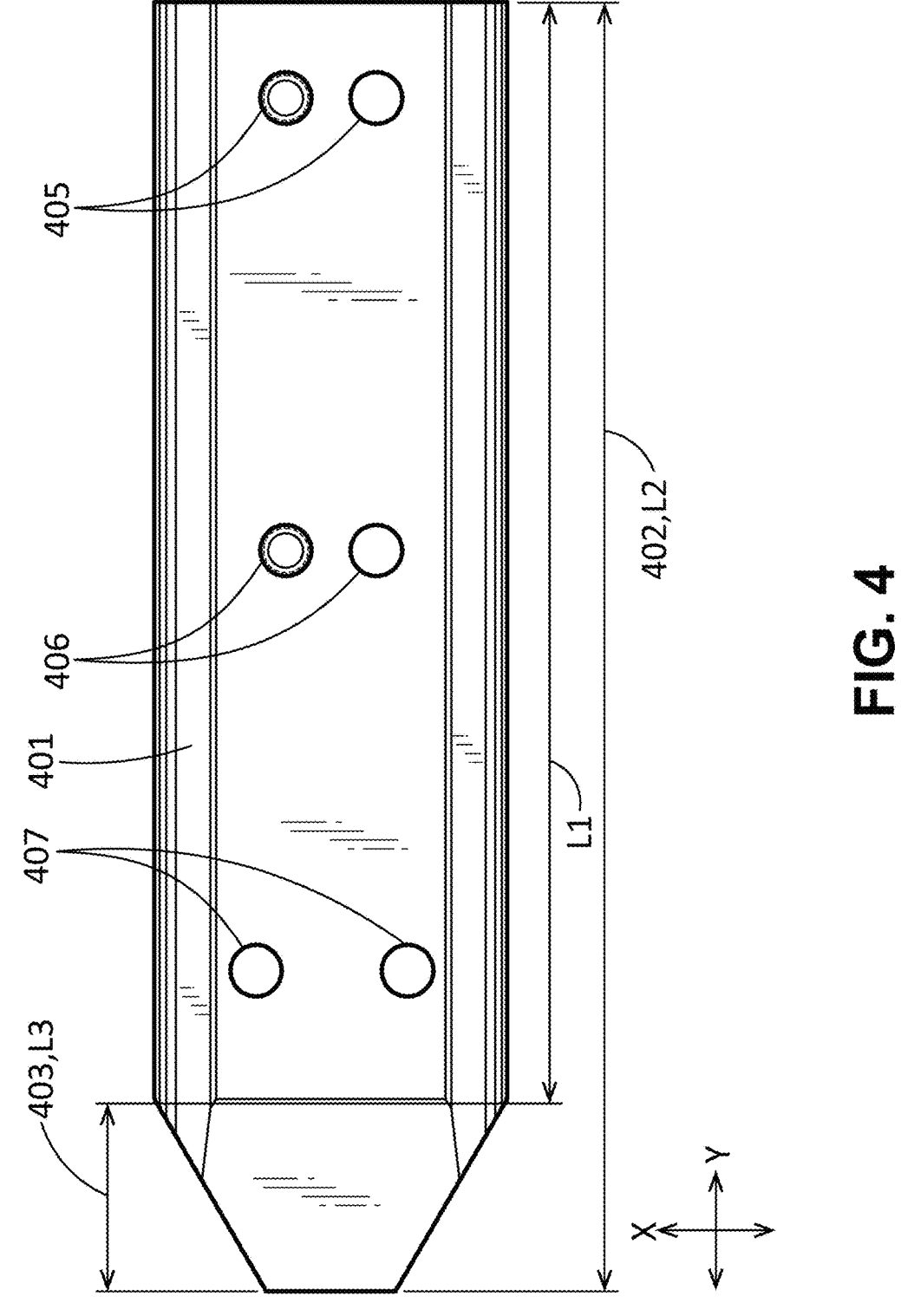
FIG. 4 is a side view of the male extrusion unit of FIG. 2.

FIG. 4 is a side view of a male extrusion unit 400. The male extrusion unit 400 comprises an elongate body 401. In some aspects, as shown, the elongate body 401 can comprise a central section 402 and a tapered end section 403. The elongate body 401 defines an overall length L1 along the longitudinal axis y; the central section 402 defines a length L2; and the tapered end section defines a length L3.

In addition, the male extrusion unit 400 defines two fastener opening sets 405,406,407. Fastener opening sets 405 and 406 are for receiving fasteners to couple the male extrusion unit 400 the rail 104. The spacing of fastener opening sets 405,406 corresponds to the spacing of fastener hole set 108 along the ends of rails 103, 104, 105, 106. Further, in the current aspect, each fastener opening set 405,406,407 comprises two fastener openings so that the male extrusion unit 400 can be coupled to either rail 103, 104, 105, 106 with fasteners.

Figure 5:
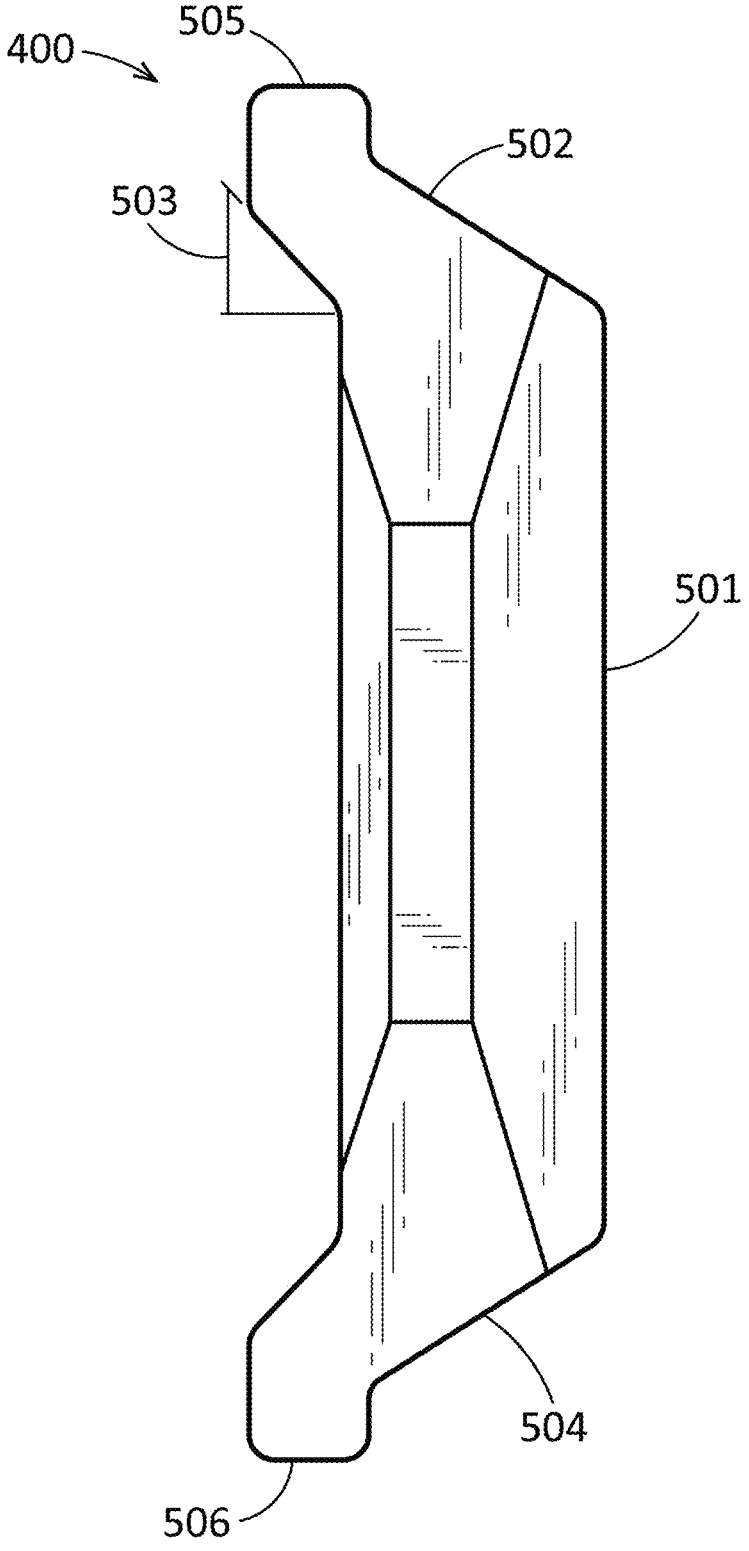
FIG. 5 is a side view of the male extrusion unit of FIG. 2.

FIG. 5 is a side view of the male extrusion unit 400. In some aspects, as shown, the male extrusion unit 400 can be defined by a middle section 501, a first wing 502, which is joined to the middle section 501 and can extend from the middle section 501, and which can be angled with respect to the middle section 501 by an angle 503, and a second wing 504, which is joined to the middle section 501, and which can extend and be angled from the middle section 501 opposite the first wing 502. As shown, the angle 503 can be 45 degrees. Each of or either of the wings 502,504 can define notches 505,506 extending from either ends of the wings 503,504 parallel to the middle section 501.

Figure 6:
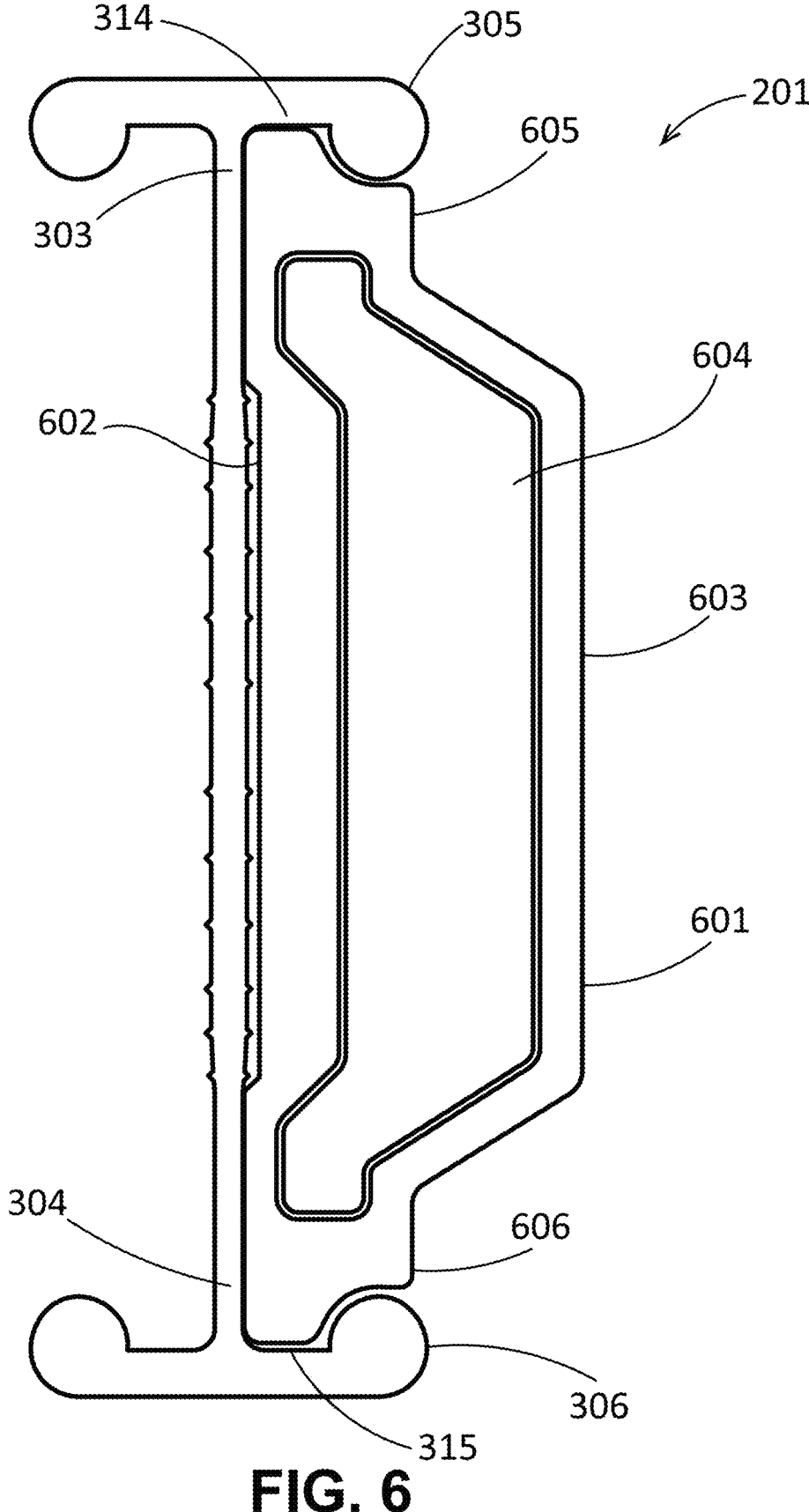
FIG. 6 is a side view of the end of the rail of FIG. 2 and a first female housing component of FIG. 2.

FIG. 6 is a side view of the end of rail 104 and, more generally, a first female housing component 201. In some aspects, as shown, each female housing component can be identical to one another in design. The female housing component 201 can comprise a main section 601, which can define a back plate 602 and a front plate 603. The main section 601 can also comprise a hollow cavity 604 or channel. The female housing component 201 can comprise a first grooved section 605 and a second grooved section 606 opposite from the first grooved section 605. The first grooved section 605 is dimensioned to be placed in a position that is nested between the first edge 303, the inner surface 314, and the first flange 305. The second grooved section 606 is dimensioned to be placed in a position that is nested between the second edge 304, the inner surface 315, and the second flange 306. The first female housing component 201 may have other configurations and may be arranged in other ways without departing from the scope of the current disclosure.

In some aspects, as shown, the hollow cavity 604 can be defined to be geometrically identical or complementary in shape to the male extrusion unit 400 so that the male extension unit 400 may be inserted into and securely retained by the female housing component 201. In some aspects, the complementary shape of the hollow cavity 604 acts effectively as bearing surfaces along which the male extrusion unit 400 can easily slide into and out of and, when positioned into the hollow cavity 604, the male extrusion unit 400 is effectively prevented from moving in a lateral or perpendicular direction to a direction of insertion, such as wiggling, jostling, twisting, or tilting.

Figure 7:
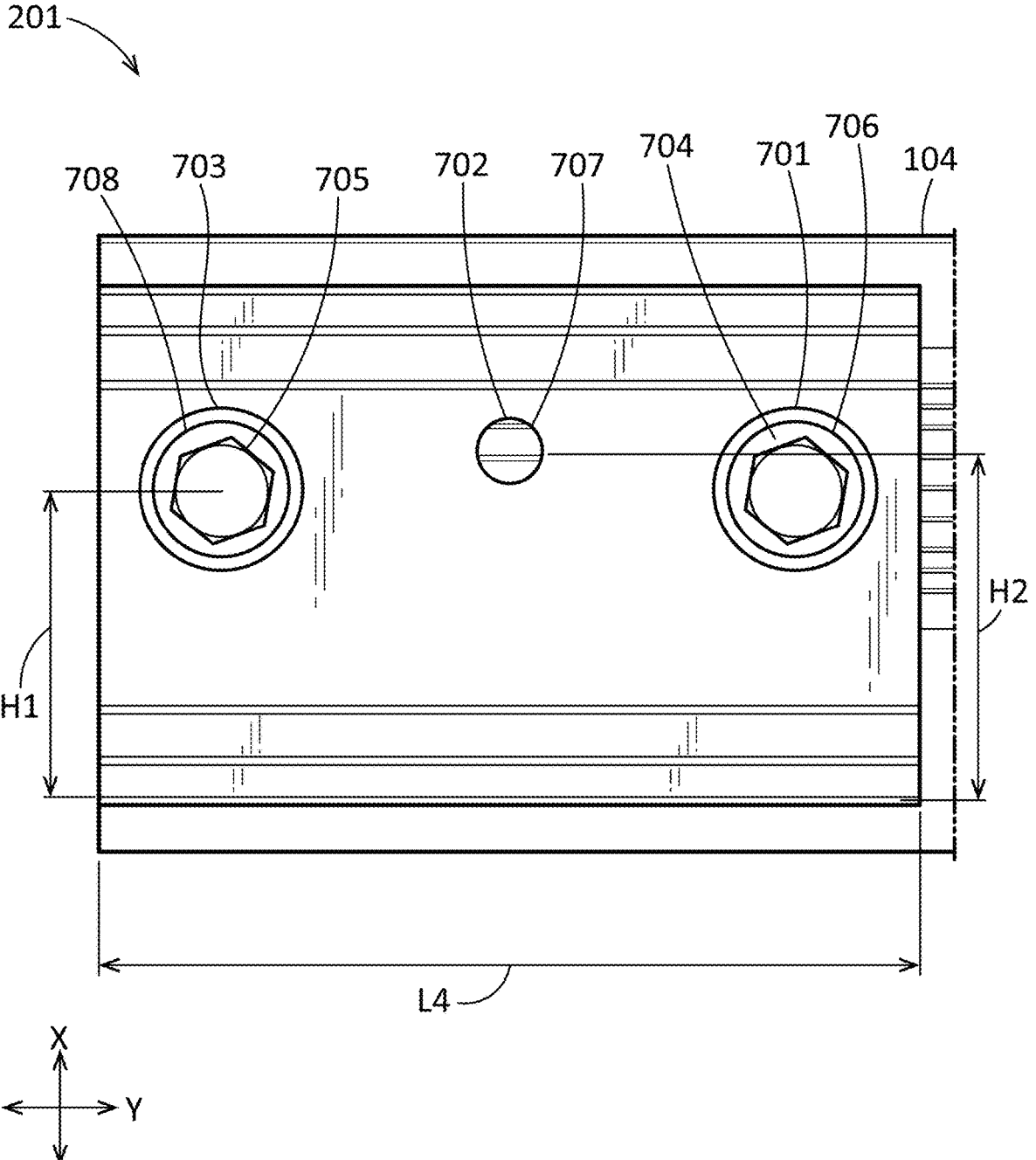
FIG. 7 is a side view of the end of a rail of FIG. 2 and a first female housing component of FIG. 2.

FIG. 7 is a side view of the end of rail 104 and the female housing component 201. The female housing component 201 extends generally along a longitudinal axis y for a length of L4. In some aspects, the female housing component 201 can define three sets of openings 701,702,703 for receiving fasteners 704 and 705 to couple the female housing component 201 and male extrusion unit 400 to rail 104. FIG. 7 shows the female housing component 201 and fasteners 704,705 without male extrusion unit 400 for illustration purposes, but fasteners 704,705 can extend through and secure the male extrusion unit 400 within the female housing component 201. The fastener openings 701,702,703 are spaced along the length L4 of the female housing component 201. The spacing of fastener opening 701,703 corresponds to the spacing of fastener hole set 108 along the ends of rail 104. Fastener opening 702 can be located between fastener openings 701,703 at an even distance from either opening 701,703, and can define a different and smaller diameter than openings 701,703. The fastener openings 701,703 define centers that are respectfully aligned with height H1 of the rail web 301 (shown in FIG. 3) of the rails 102a. Fastener opening 702 defines a center along a height H2. The fastener openings 701,702,703 may have other configurations and may be arranged in other ways without departing from the scope of the current disclosure.

Figure 8:
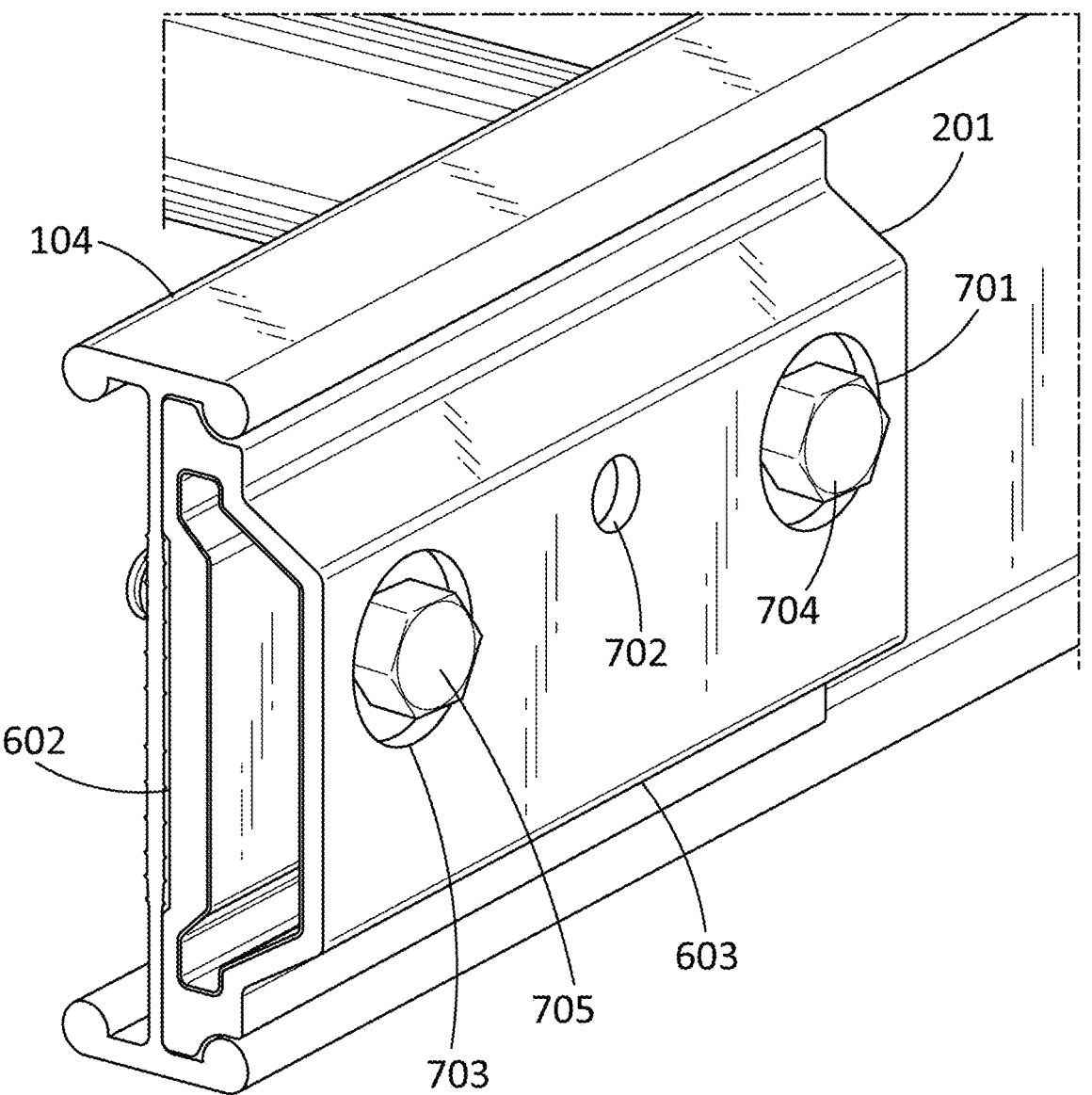
FIG. 8 is a front perspective view of the end of the rail of FIG. 2 and the female housing component of FIG. 2, with the male extrusion unit removed.

FIG. 8 is a front perspective view of the end of rail 104 and the female housing component 201, again without the male extrusion unit 400 for illustration purposes. Fasteners 704 and 705 are used to secure the male extrusion unit 400 within the female housing component 201 and to couple both the male extrusion unit 400 and the female housing component 201 to rail 104. Fasteners 704 and 705 extend through both the front plate 603 and the back plate 602 of the female housing component 201a.

Figure 9:
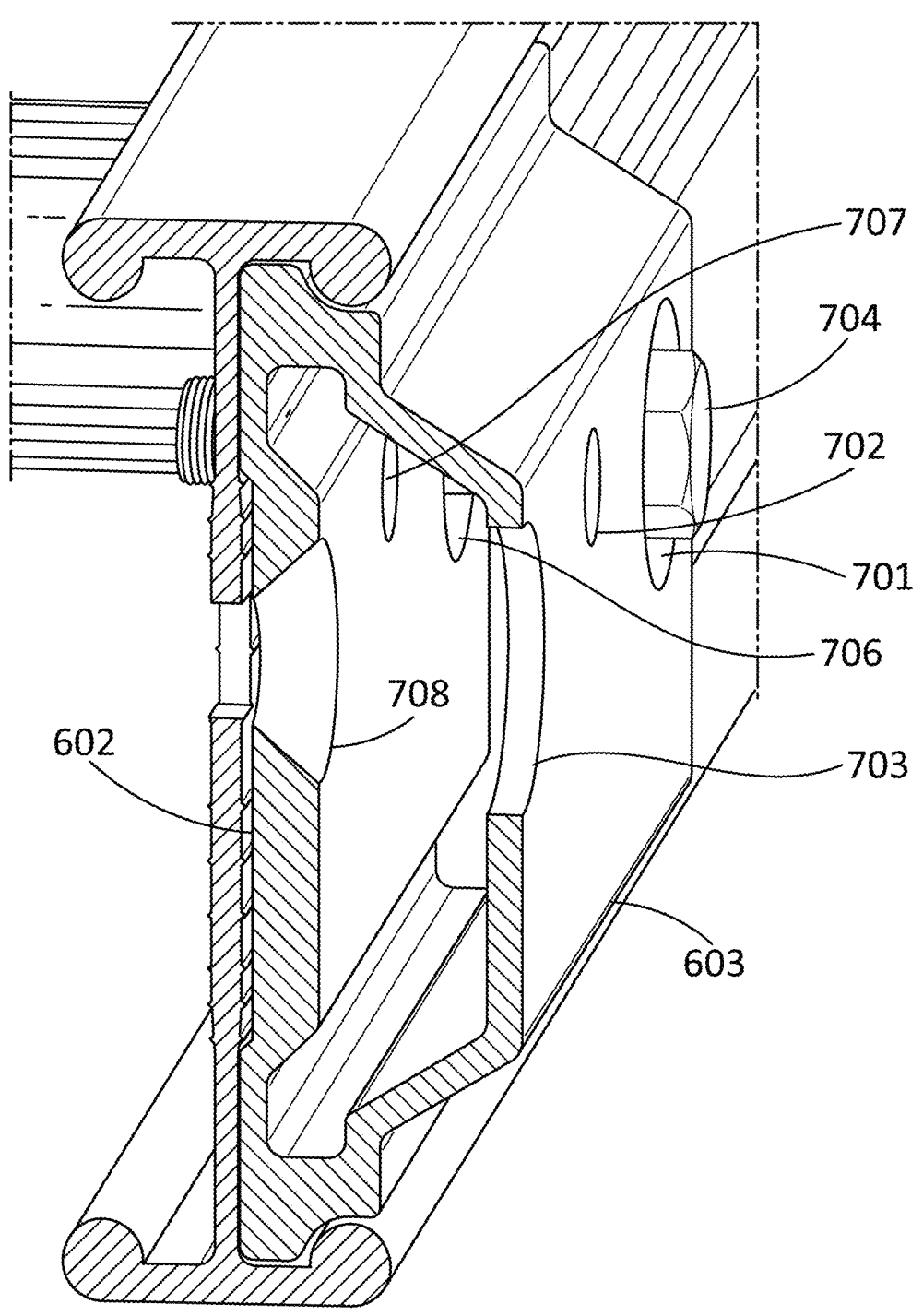
FIG. 9 is a front perspective sectional view of the rail of FIG. 2 and the female housing component of FIG. 2 taken along line 9-9 of FIG. 2, with a bolt and the male extrusion unit removed.

FIG. 9 is a front perspective sectional view the rail 104 and the female housing component 201 of FIG. 2 taken along line 9-9 of FIG. 2, again without the male extrusion unit 400 for illustration purposes and additionally with fastener 705 removed. In some aspects, as shown, fastener holes 701,702,703 can be defined as through holes, going through both the front plate 603 and back plate 602 of the female housing component 201. Fastener holes 701 and 703 can define countersinks at the back plate 602 of the female housing component 201.

Figure 10:
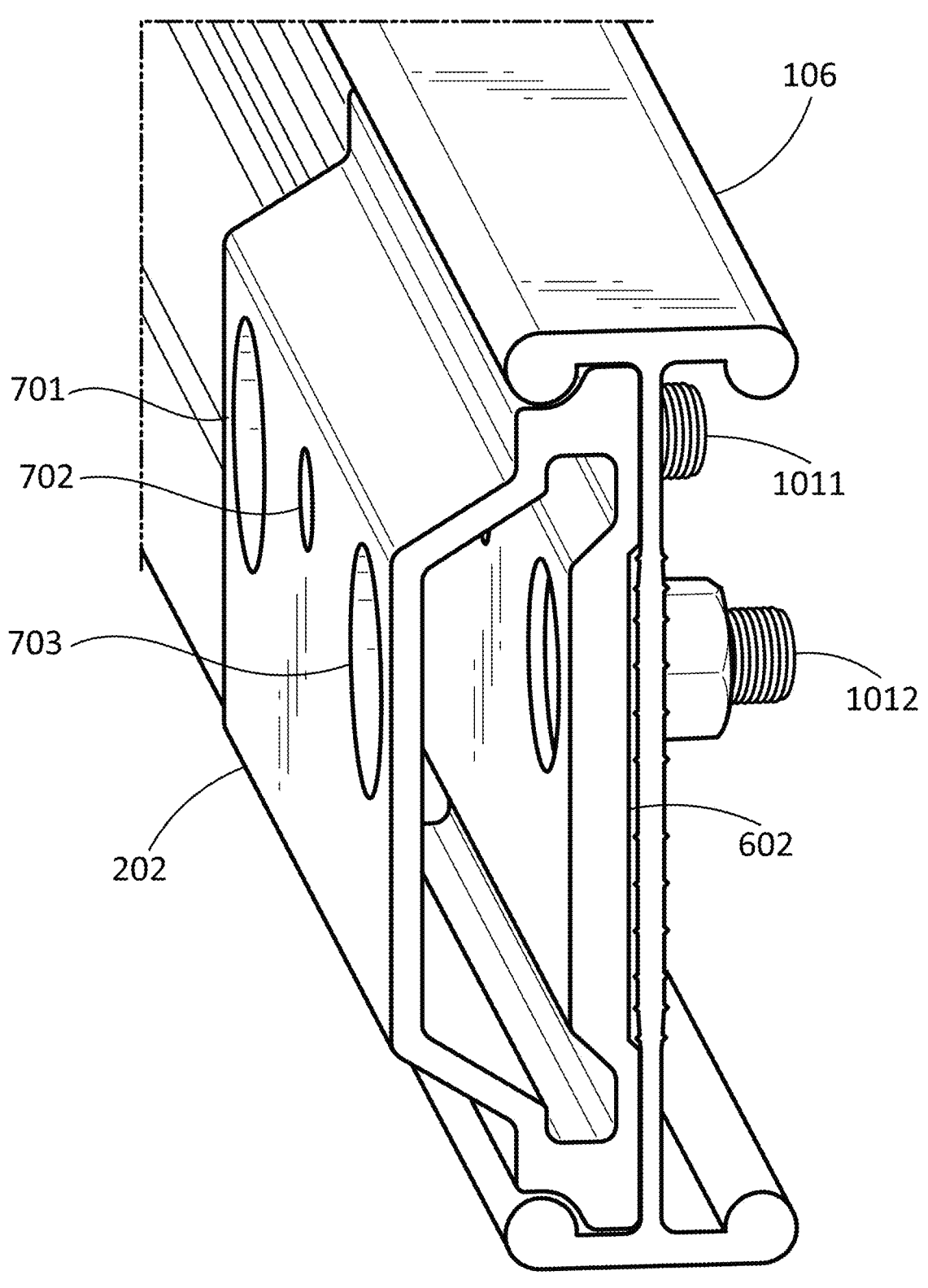
FIG. 10 is a front perspective view of the end of the second rail of FIG. 2 and the second female housing component of FIG. 2.

FIG. 10 is a front perspective view of the end of the rail 106 and the second female housing component 202 of FIG. 2. In some aspects, as shown, the second female housing component 202 can be identical in design to the first female housing component 201. Fasteners 1011 and 1012 are used to couple the second female housing component 202 to rail 106. Fasteners 1011 and 1012 extend through the back plate 602 of the second female housing component 202.

Figure 11:
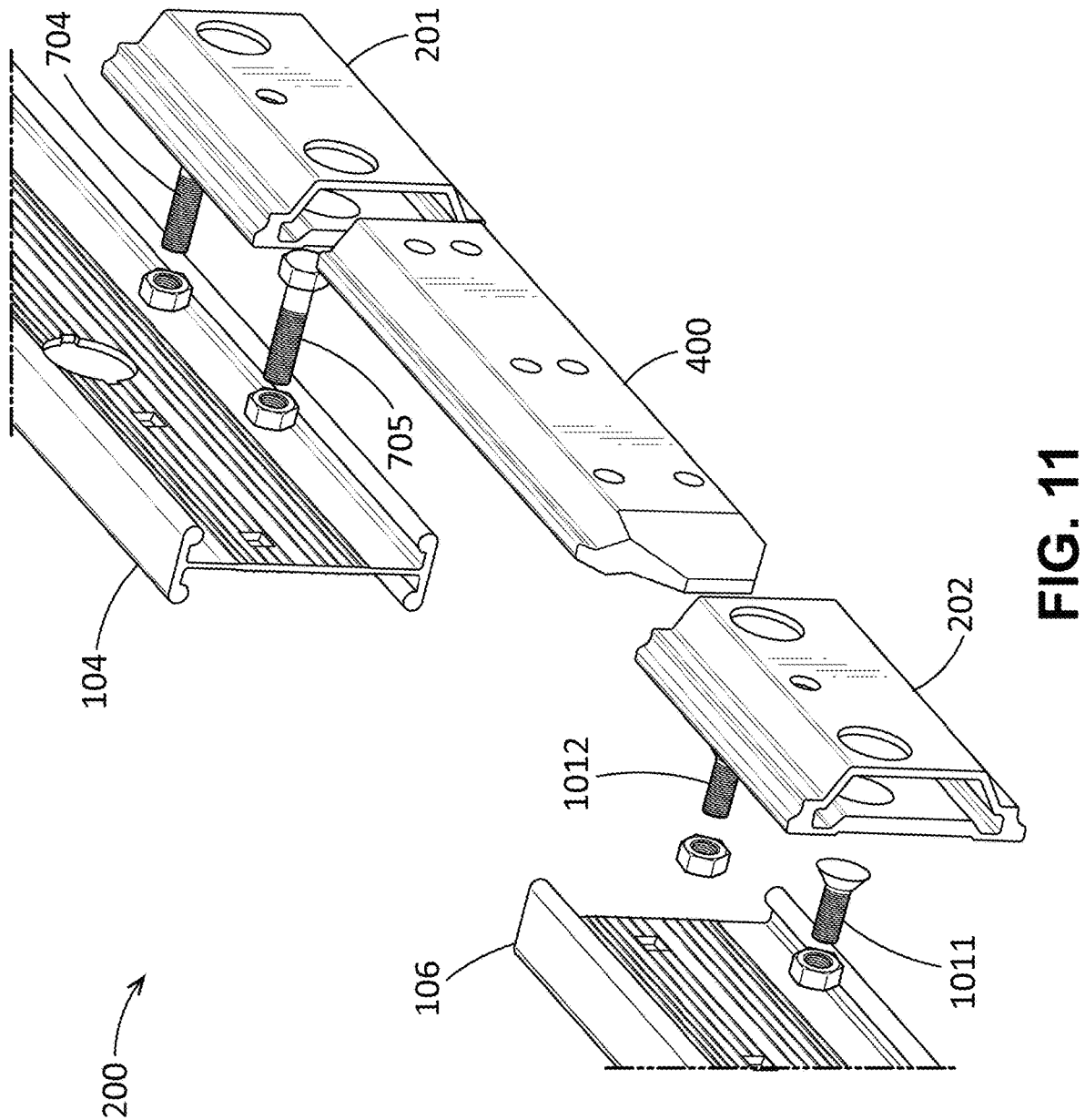
FIG. 11 is a front perspective exploded view of the splice plate assembly of FIG. 2.

FIG. 11 is a front perspective exploded view of the splice plate assembly 200 of FIG. 2. As shown in FIG. 11, fasteners 1011,1012 can define countersunk heads, which are complementary to and engage the countersinks of fastener holes 701,703 at the back plate 602 of the female housing component 202. The complementary countersunk heads of the fasteners 1011, 1012 allow the heads of fasteners 1011, 1012 to fit entirely within the countersinks of the fastener holes 701,703 at the back plate 602 of the female housing component 202, thereby providing clearance for the male extrusion unit 400 to slide into the hollow cavity 604 of the female housing component 202 without interference from the fasteners 1011,1012.

Figure 12:
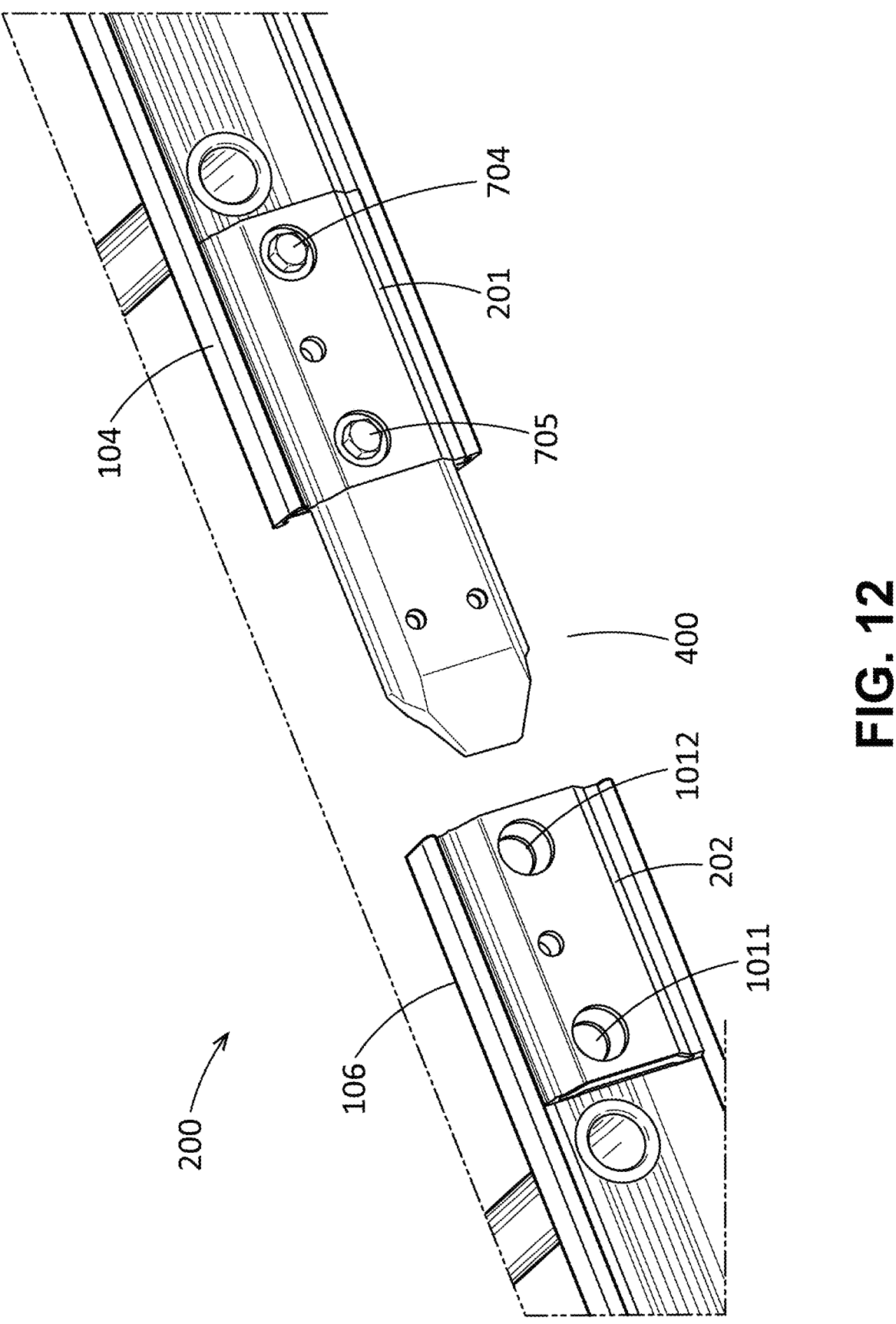
FIG. 12 is a front perspective view of the splice plate assembly of FIG. 2 showing the male extrusion unit inserted and secured to the first female housing component and ready to be inserted into the second female housing component.

FIG. 12 front perspective view of the splice plate assembly 200 of FIG. 2 showing the male extrusion unit 400 inserted and secured to the first female housing component 201 but not inserted into the second female housing component 202. The first female housing component 201 is slidably nested on to rail 104. The elongate body 401 of the male extrusion unit 400 is inserted into the hollow cavity 604 of the first female housing component 201 until the fastener holes 405 and 406 of the male extrusion unit 400 align with fastener holes 701 and 703 of the first female housing component 201 and fastener holes 109 of rail 104. Fasteners 704 is inserted into opening 701 of the front plate 603 of the first female housing component 201 and goes through opening 405 of the male extrusion unit 400, opening 701 of the back plate 602 of the first female housing component 201, and through the fastener hole 109 of rail 104. Fastener 705 is inserted into opening 703 of the front plate 603 of the first female housing component 201 and goes through opening 406 of the male extrusion unit 400, opening 703 of the back plate 602 of the first female housing component 201, and through the fastener hold 109 of rail 104.

The second female housing component 202 is slidably nested on to rail 106. Fastener 1011 is inserted into opening 701 of the back plate 602 of the second female housing component 202 and through opening 109 of rail 106. Fastener 1012 is inserted into opening 703 of the back plate 602 of the second female housing component 202 and through opening 109 of rail 106.

Figure 13:
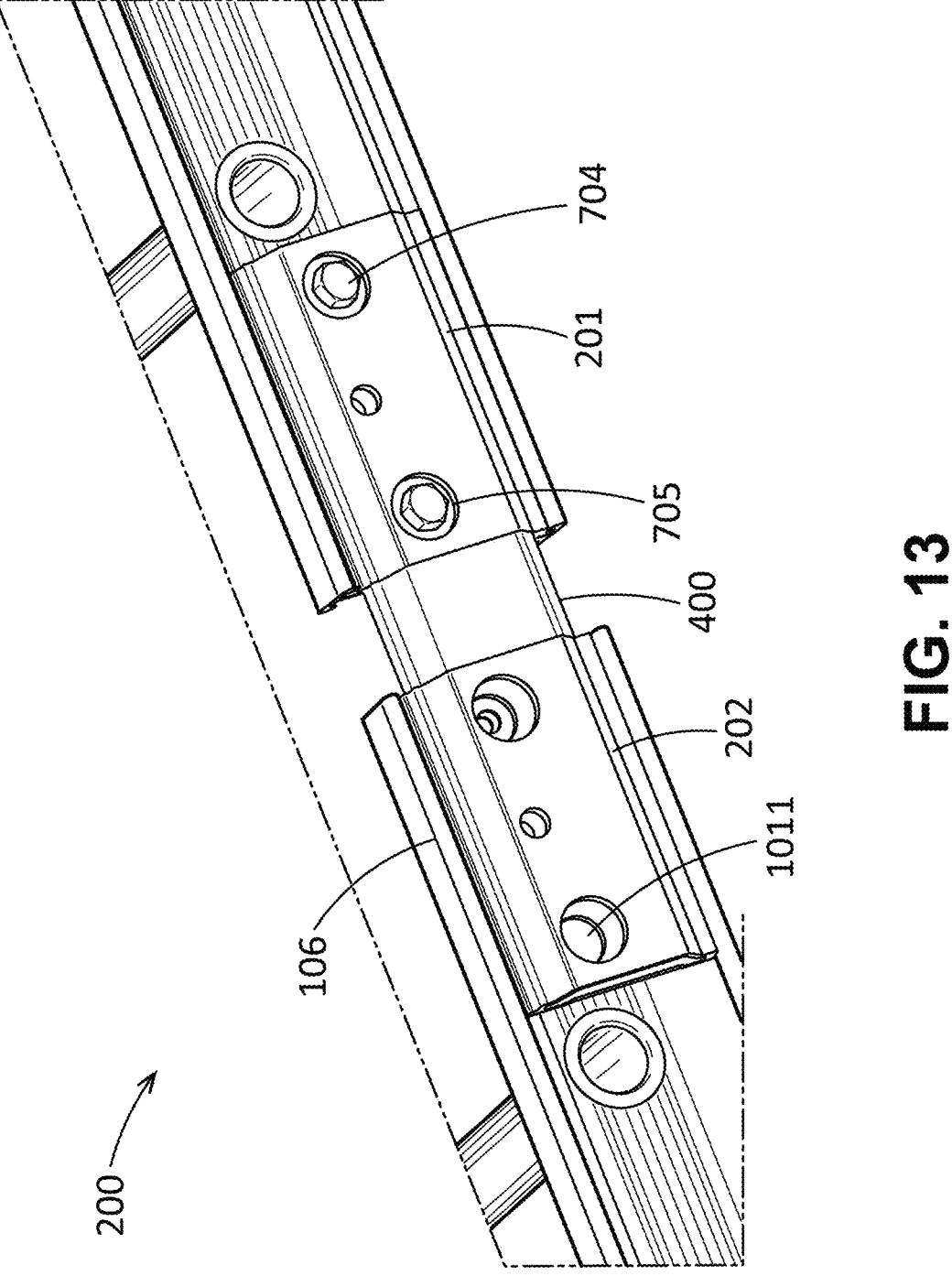
FIG. 13 is a front perspective view of the splice plate assembly of FIG. 2 showing the male extrusion unit inserted and secured to the first female housing component and the male extrusion unit partially inserted into the second female housing component.

FIG. 13 front perspective view of the splice plate assembly 200 of FIG. 2 showing the male extrusion unit 400 inserted and secured to the first female housing component 201 and the male extrusion unit 400 partially inserted into the second female housing component 202. The tapered end section 403 of the male extrusion unit 400 allows easier insertion of the male extrusion unit 400 into the hollow cavity 604 of the second female housing component 202.

Figure 14:
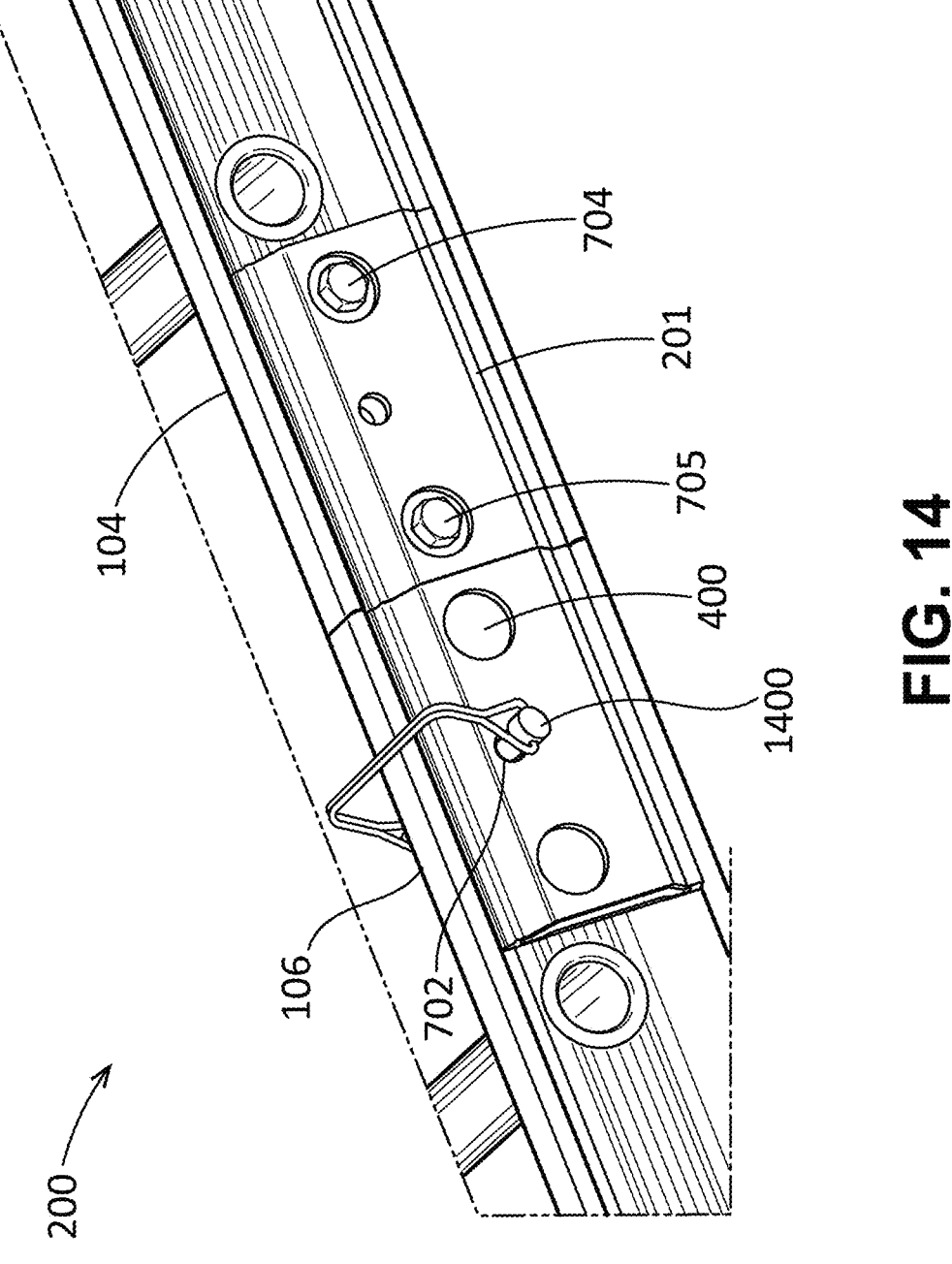
FIG. 14 is a front perspective view of the splice plate assembly of FIG. 2 showing the male extrusion unit inserted and secured to the first female housing component and the male extrusion unit inserted and secured to the second female housing component.

FIG. 14 is a front perspective view of the splice plate assembly 200 of FIG. 2 showing the male extrusion unit 400 inserted and secured to the first female housing component 201 and the male extrusion unit 400 fully inserted into the second female housing component 202. In some aspects, a fastener, such as a pin 1400, can be inserted into fastener opening 702 of the front plate 603 of the second female housing component 202 and through opening 407 of the male extrusion unit 400 and the fastener opening 702 of the back plate 602 of the second female housing component 202 to secure the male extrusion unit 400 to the second female housing component 202.

Figure 15:
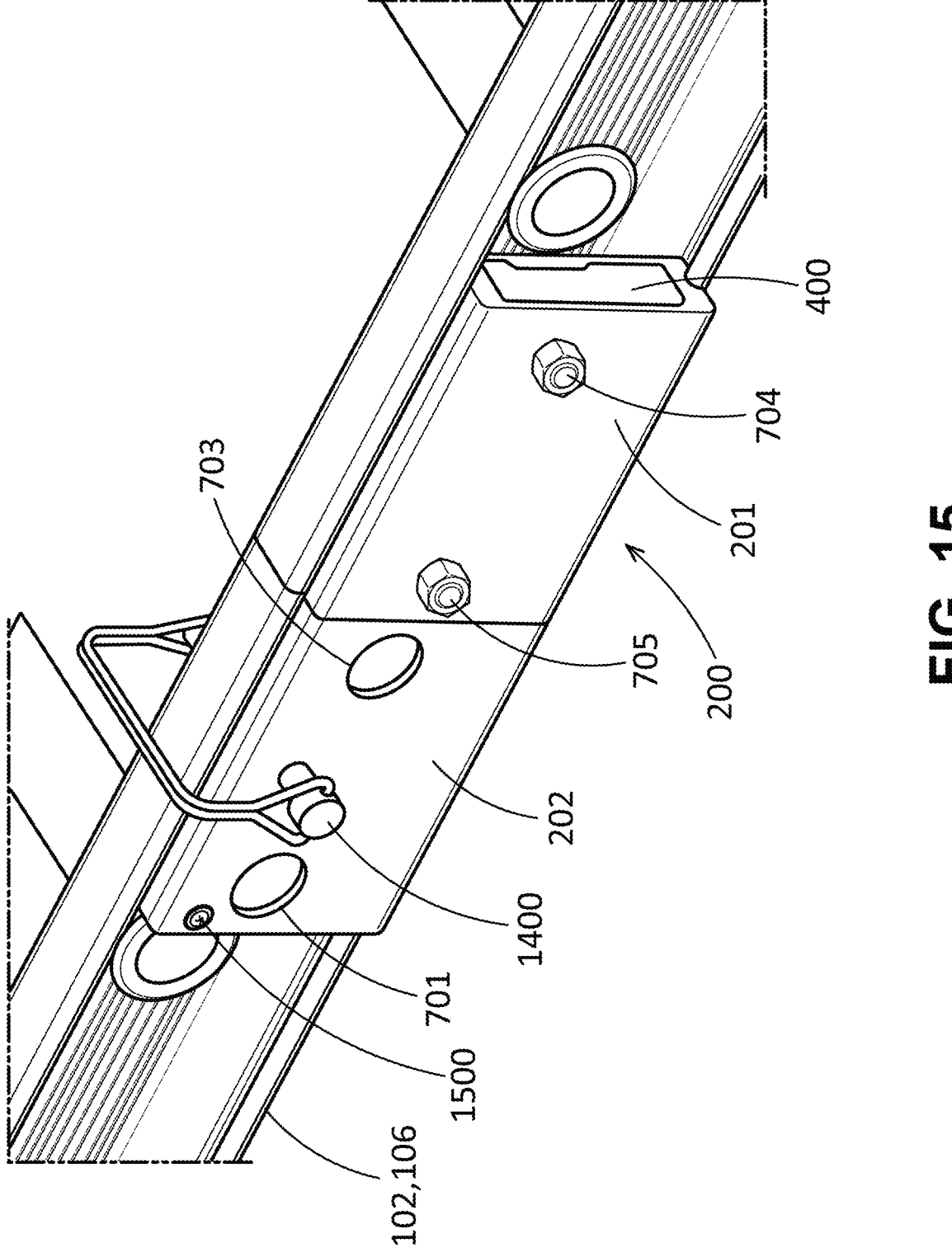
FIG. 15 is a front perspective view of a splice plate assembly in accordance with another aspect of the current disclosure.

FIG. 15 is a front perspective view of an alternate design of splice plate assembly 200. As shown, the female housing components 201,202 may not be substantially similar in design. In some aspects, the female housing component 202 can define larger fastener openings 701,703 than female housing component 201, so as to accept fasteners 1011, 1012 within the female housing component 202, while the fasteners 704,705 can be oriented such that nuts are positioned opposite from the rail 104 against front plate 603. Further, a stopping screw 1500 or other pin can extend through a distal end of the female housing component 202, which can act as a stop to prevent further insertion of the male extrusion unit 400 through the female housing component 202.

One should note that conditional language, such as, among others, "can," "could," "might," or "may," unless expressly stated otherwise, or otherwise understood within the context as used, is generally intended to convey that certain aspects include, while other aspects do not include, certain features, elements, and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Many variations and modifications may be made to the above-described aspect(s) without departing substantially from the spirit and principles of the present disclosure. Further, the scope of the present disclosure is intended to cover any combinations and sub-combinations of all elements, features, and aspects discussed above. All such modifications and variations are intended to be included within the scope of the present disclosure, and all possible claims to individual aspects or combinations of elements or steps are intended to be supported by the present disclosure.

That which is claimed is:

1. A splice plate assembly for a track assembly system, the splice plate assembly comprising:

a female housing component defining a first grooved section and a second grooved section, the female housing component configured to be coupled to a first track of the system, wherein the first grooved section is configured to nest against a first flange of the first track and the second grooved section is configured to nest against a second flange of the first track; and a male extrusion unit, the male extrusion unit configured to be coupled to a second track of the system and configured to be slideably coupled to the female housing component;

wherein:

the male extrusion unit comprises a body extending from a first unit end of the male extrusion unit to a second unit end of the male extrusion unit;

the body defines a length, a height, and a depth;

the length of the body extends from the first unit end to the second unit end;

the height of the body extends from a top unit end of the male extrusion unit to a bottom unit end of the male extrusion unit;

the height of the body tapers inward from each of the top unit end and the bottom unit end at the second unit end to define a tapered end section configured to facilitate guiding the second unit end into the female housing component;

the female housing component is a first female housing component, and wherein the splice plate assembly comprises a second female housing component;

each of the first and second female housing components contain of plurality of fastener openings; and the body of the male extrusion unit contains a plurality of fastener openings configured to align with the fastener openings located on the first female housing component.

2. The splice plate assembly of claim 1, wherein the first and the second female housing component comprise complimentary shapes.

3. The splice plate assembly of claim 2, wherein each of the first and second female housing components define a cavity extending from a first end of the female housing component to a second end of the female housing component.

4. The splice plate assembly of claim 3, wherein the cavity of each of the first and second female housing components is sized to slideably receive a portion of the male extrusion unit, and wherein the tapered end section of the male extrusion unit is configured to aid in guiding the male extrusion unit into the cavity of the second female housing component.

5. The splice plate assembly of claim 1, wherein each of the fastener openings of the first and second female housing components correspond to fastener openings located on the first and second tracks of the system.

6. The splice plate assembly of claim 1, wherein the depth of the body tapers at the second end to further define the tapered end section.

7. The splice plate assembly of claim 1, wherein the height of the body at the second end is less than the height of the body at the first end.

8. The splice plate assembly of claim 1, wherein
each of the first and second female housing components defines a front plate and a back plate;
the plurality of fastener openings of the first female housing component comprise a rail fastener opening and a unit fastener opening;
the rail fastener opening is formed at least through the back plate; and
the unit fastener opening is formed at least through the front plate.

9. The splice plate assembly of claim 8, wherein:
the rail fastener opening of the first female housing component extends through each of the front plate and the back plate; and
a rail fastener engages the rail fastener opening of the first female housing component and is configured to engage a first track opening of the first track to couple the first female housing component to the first track; and
the rail fastener engages the rail fastener opening of the first female housing component at the back plate only.

10. The splice plate assembly of claim 9, wherein:
the rail fastener opening of the first female housing component defines a countersink at the back plate; and
a head of the rail fastener engages the countersink.

11. The splice plate assembly of claim 8, wherein:
the plurality of fastener openings of the male extrusion unit comprise a first attachment fastener opening;
the unit fastener opening of the first female housing component is aligned with the first attachment fastener opening of the male extrusion unit; and
a unit fastener engages each of the unit fastener opening and the first attachment fastener opening to couple the male extrusion unit to the female housing component.

12. The splice plate assembly of claim 11, wherein the unit fastener is a pin.

13. The splice plate assembly of claim 11, wherein:
the plurality of fastener openings of the second female housing component comprise a mounting fastener opening;
the plurality of fastener openings of the male extrusion unit comprise a second attachment fastener opening aligned with the mounting fastener opening;
a mounting fastener engages the mounting fastener opening and the second attachment fastener opening to couple the male extrusion unit to the second female housing component; and
the mounting fastener engages the mounting fastener opening of the second female housing component at each of the front plate and the back plate.

14. The splice plate assembly of claim 13, wherein the mounting fastener is further configured to engage a second track opening of the second track to couple the second female housing component and the male extrusion unit to the second track.

15. A method of using a track assembly system, the method comprising:
coupling a first female housing component to an end of a first track, wherein:
the first track defines a first flange and a second flange opposite the first flange;
the first female housing component defines a first grooved section and a second grooved section; and
coupling the first female housing component to the end of the first track comprises nesting the first grooved section against the first flange and nesting the second grooved section against the second flange;
coupling a first end portion of a male extrusion unit to an end of a second track; and
inserting an opposite second end portion of the male extrusion unit into the first female housing component;
wherein:
the male extrusion unit comprises a body extending from a first unit end of the male extrusion unit to a second unit end of the male extrusion unit;
the first end portion is arranged proximate the first unit end and the second end portion is arranged proximate the second unit end;
the body defines a length, a height, and a depth;
the length of the body extends from the first unit end to the second unit end;
the height of the body extends from a top unit end of the male extrusion unit to a bottom unit end of the male extrusion unit;
the height of the body tapers inward from each of the top unit end and the bottom unit end at the second unit end to define a tapered end section configured to facilitate guiding the second unit end into the first female housing component; and
coupling the first end portion of the male extrusion unit to the end of the second track comprises inserting fasteners through a second female housing component and the male extrusion unit into the end of the second track.

16. The method of claim 15, wherein the male extrusion unit is a first male extrusion unit, the method further comprising:
coupling a third female housing component to the end of the first track; and
coupling a second male extrusion unit to the end of the second track; and
inserting an opposite second end portion of the second male extrusion unit into the third female housing component when the second end portion of the first male extrusion unit is inserted into the first female housing component.

17. The method of claim 15, wherein coupling the first female housing component to the end of the first track comprise inserting second fasteners inserted through the first female housing component and the end of the first track, and wherein after insertion, the second fasteners provide clearance for the male extrusion unit to be inserted into the first female housing component.

18. The method of claim 15, the method further comprising duplicating the method of using a track assembly system on the another side of the first and the second tracks.

* * * * *